United States Patent
Stang et al.

(10) Patent No.: US 12,290,791 B2
(45) Date of Patent: May 6, 2025

(54) ACCURATE ODORIZATION CONTROL

(71) Applicant: GPL Odorizers LLC, Lakewood, CO (US)

(72) Inventors: Adrian Charles Stang, Arvada, CO (US); Charles Spencer Toft, Centennial, CO (US); Preston Tyler Bender Marcoux, Littleton, CO (US)

(73) Assignee: GPL Odorizers LLC, Lakewood, CO (US)

( * ) Notice: Subject to any disclaimer, the term of this patent is extended or adjusted under 35 U.S.C. 154(b) by 124 days.

(21) Appl. No.: 18/347,692

(22) Filed: Jul. 6, 2023

(65) Prior Publication Data

US 2023/0356161 A1 Nov. 9, 2023

Related U.S. Application Data

(63) Continuation-in-part of application No. 17/934,010, filed on Sep. 21, 2022, now Pat. No. 11,712,672.
(Continued)

(51) Int. Cl.
*B01F 35/22* (2022.01)
*B01F 35/221* (2022.01)
(Continued)

(52) U.S. Cl.
CPC ...... *B01F 35/2202* (2022.01); *B01F 35/2211* (2022.01); *B01F 35/2213* (2022.01); *B01F 35/2217* (2022.01); *B01F 35/718051* (2022.01); *C10L 3/006* (2013.01); *G05D 11/02* (2013.01); *G05D 11/135* (2013.01); *C10L 2230/10* (2013.01); *C10L 2290/141* (2013.01)

(58) Field of Classification Search
CPC ...... G05D 11/02; G05D 11/13; G05D 11/131; G05D 11/132; C10L 2290/141; C10L 2230/10; Y10T 137/0329; Y10T 137/0352; Y10T 137/2499; Y10T 137/7761; B01F 35/2202; B01F 35/2203; B01F 35/2211; B01F 35/2217
USPC ...................................... 137/487.5
See application file for complete search history.

(56) References Cited

U.S. PATENT DOCUMENTS

2,166,370 A * 7/1939 Putnam ............... C10L 3/006
134/167 C
2,175,526 A * 10/1939 Hutchison ............ C10J 1/00
222/630
(Continued)

*Primary Examiner* — William M McCalister (57) ABSTRACT

A system is provided. The system includes one or more of a fuel media supply, coupled to a media supply injection valve and a fuel media supply flow meter, configured to provide unodorized fuel media, an odorant supply, configured to provide pressurized odorant and coupled to each of a first actuator to allow odorant flow at a first pressure, a second actuator to allow odorant flow at a second pressure, and a manual ball valve, a mixture receiver, coupled to the fuel media supply, each of the first and second actuators, and a manual flow metering valve, configured to receive odorized fuel media comprising a mixture of the unodorized fuel media and regulated pressurized odorant, and a control system, configured to initiate production of the mixture, adjust the mixture with the first and second actuators, in response to the mixture does not include a desired concentration of the odorant and terminate production of the mixture.

20 Claims, 8 Drawing Sheets

Related U.S. Application Data (60) Provisional application No. 63/337,659, filed on May 3, 2022.

(51) Int. Cl.
*B01F 35/71* (2022.01)
*C10L 3/00* (2006.01)
*G05D 11/02* (2006.01)
*G05D 11/13* (2006.01)

(56) References Cited

U.S. PATENT DOCUMENTS

| | | | |
|---|---|---|---|
| 2,180,584 A * | 11/1939 | Green | C10J 1/00 261/130 |
| 2,823,104 A | 2/1958 | McClure | |
| 3,112,189 A | 11/1963 | Elliott | |
| 3,219,046 A * | 11/1965 | Waugh | F16L 55/00 700/265 |
| 3,404,971 A | 10/1968 | Olund | |
| 3,634,053 A | 1/1972 | Klass et al. | |
| 3,762,428 A | 10/1973 | Beck et al. | |
| 3,939,858 A * | 2/1976 | LeMay | G05D 11/131 48/195 |
| 4,019,523 A | 4/1977 | Clark et al. | |
| 4,262,686 A | 4/1981 | Heim et al. | |
| 4,320,775 A * | 3/1982 | Stirling | G01F 23/0038 137/101.25 |
| 4,487,613 A | 12/1984 | Yoshida et al. | |
| 4,611,294 A * | 9/1986 | Stanfill | G05D 11/132 700/285 |
| 5,406,970 A * | 4/1995 | Marshall | G05D 11/131 137/101.25 |
| 5,490,726 A | 2/1996 | Davis et al. | |
| 5,632,295 A * | 5/1997 | Smars | C10L 3/006 137/98 |
| 6,092,364 A | 7/2000 | Stellwagen | |
| 6,142,162 A * | 11/2000 | Arnold | G05D 11/133 137/101.21 |
| 6,208,913 B1 | 3/2001 | Marshall et al. | |
| 6,223,762 B1 * | 5/2001 | Ghaeli | C10L 3/003 137/68.22 |
| 6,273,120 B1 | 8/2001 | Hofmann et al. | |
| 6,745,799 B1 * | 6/2004 | Fuglevand | F17D 1/04 48/190 |
| 7,108,803 B1 | 9/2006 | Mansfeld et al. | |
| 7,056,360 B2 | 12/2006 | Zeck | |
| 7,229,831 B2 | 6/2007 | Puri | |
| 7,389,786 B2 | 6/2008 | Zeck | |
| 8,202,331 B2 | 6/2012 | Welker et al. | |
| 8,206,854 B2 | 6/2012 | Flynn et al. | |
| 8,354,043 B2 | 1/2013 | Flynn et al. | |
| 8,746,274 B2 * | 6/2014 | Izutani | C01B 3/00 137/341 |
| 10,179,882 B2 * | 1/2019 | Cagnon | B01F 23/21321 |
| 10,344,237 B2 | 7/2019 | Welker et al. | |
| 10,995,293 B2 | 5/2021 | Welker et al. | |
| 11,209,838 B2 | 12/2021 | Welker et al. | |
| 2005/0155644 A1 | 7/2005 | Woollums | |
| 2012/0261619 A1 | 10/2012 | Flynn et al. | |
| 2021/0062977 A1 | 3/2021 | Welker | |
| 2021/0108763 A1 | 4/2021 | Sams | |
| 2023/0356161 A1 * | 11/2023 | Stang | G05D 11/135 |

* cited by examiner

Fig. 1 Odorized Fuel Delivery System

Fig. 2 Mechanical System

Fig. 3 Control System

Fig. 4 Flow Rate-Based Process

Fig. 6 First and Second Modulation of First and Second Actuators

Fig. 7 Manual Process for Continuous-Flow Mixture Receiver

Fig. 8 Manual Process for Fixed-Capacity Mixture Receiver

ACCURATE ODORIZATION CONTROL

CROSS REFERENCE TO RELATED APPLICATION

This application is a Continuation-in-Part of Pending application Ser. No. 17/934,010 filed Sep. 21, 2022, which claims priority from earlier filed provisional application No. 63/337,659 filed May 3, 2022 and entitled "ACCURATE ODORIZATION CONTROL", the entire contents of each are hereby incorporated by reference.

FIELD

The present invention is directed to apparatuses and systems for adding odorant to propane and natural gas media. In particular, the present invention is directed to apparatuses and systems for efficiently metering and delivering odorant blends to achieve desired injection rates.

BACKGROUND

Natural gas processing begins at a well head. The composition of raw natural gas extracted from producing wells depends on the type, depth, and location of the underground deposit and the geology of the area. Oil and natural gas are often found together in the same reservoir. The natural gas produced from oil wells is generally classified as associated-dissolved gas meaning that the gas had been associated with or dissolved in crude oil. Natural gas production not associated with crude oil is classified as "non-associated." In 2009, 89 percent of U.S. wellhead production of natural gas was non-associated.

Natural gas processing plants purify raw natural gas by removing contaminants such as solids, water, carbon dioxide ($CO_2$), hydrogen sulfide ($H_2S$), mercury, and higher molecular mass hydrocarbons. Some of the substances which contaminate natural gas have economic value and are further processed or sold. An operational natural gas plant delivers pipeline-quality dry natural gas that can be used as fuel by residential, commercial, and industrial consumers, or as a feedstock for chemical synthesis.

Odorants may be added to odorless gases, such as natural gas or propane, so that they can be detected easily by human smell. Conventional odorants include mercaptans, methyl sulfides, aliphatic sulfides, dimethylsulfide as well as various blends of other commonly accepted chemicals. Odorants that may be used with natural gas are extremely odiferous and volatile, so that only a small amount of concentrated liquid is needed to odorize a relatively large volume of natural gas or propane. Odorants used for natural gas or propane may vary from country to country, depending on gas distribution regulations. Some odorants may contain sulfur, which is oxidized to sulfur dioxide when the gas is burned. For very high volume systems (and for some smaller volume systems), liquid injection odorizers are being manufactured. These odorizers work by the addition of small amounts of liquid odorant to moving gas. A pump that can be controlled to give the range of addition rates necessary may be an important aspect of this type of odorizer. Computer control to monitor flow rates and vary injection rate is a significant part of the more modern versions of this.

An odorizer is a device that adds an odorant to a gas. The most common type is one that adds a mercaptan liquid into natural gas or propane distribution systems so that leaks can be readily detected. Other types have been used for carbon dioxide fire extinguishers. Equipment that provides natural gas odorization runs the gamut from a simple wick in a container to computerized equipment, which controls the amount of odorant based on flow rate, tracks the amount of odorant in inventory, and may generate alarms when odorant is not being injected into the gas stream.

Various techniques have been developed for odorizing natural gas. One technique consists of injecting liquid odorant directly into natural gas pipelines. A high pressure injection pump draws odorants from a liquid storage tank into the gas pipeline where the odorants evaporate throughout the gas in the pipeline. Liquid odorant pressure is typically stepped down in the injection system and the released pressure is directed into an expansion tank. At regular intervals, gas may be released from the expansion tank so as to maintain the pressure within the expansion tank under a predetermined pressure threshold. The gas released from the expansion tank may be typically passed through a filter before being discharged as an odorant-free gas.

SUMMARY

In accordance with embodiments of the present invention, a system is provided. The system includes one or more of a fuel media supply, an odorant supply, a mixture receiver, and a control system. The fuel media supply is configured to provide unodorized fuel media, and is coupled to a media supply injection valve and a fuel media supply flow meter. The odorant supply is configured to provide pressurized odorant and is coupled to an odorant pressure regulator, which is configured to provide regulated pressurized odorant and is coupled to each of a first actuator, configured to allow regulated pressurized odorant flow at a first pressure when enabled, a manual ball valve, configured to allow regulated pressurized odorant flow to be manually adjusted between no flow and the first pressure when enabled, also coupled to a manual flow metering valve, and a second actuator, configured to allow regulated pressurized odorant flow at a second pressure lower than the first pressure when enabled. The mixture receiver is coupled to the fuel media supply and each of the first and second actuators and the manual flow metering valve, and is configured to receive odorized fuel media including a mixture of the unodorized fuel media and regulated pressurized odorant. The control system includes a processor and a memory, coupled to the processor. The memory includes instructions, that when executed by the processor, are configured to initiate production of the mixture, adjust the mixture with the first and second actuators, in response to the mixture does not include a desired concentration of the regulated pressurized odorant, and terminate production of the mixture.

In accordance with embodiments of the present invention, a method is provided. The method includes one or more of determining one or more actuators of a system to provide odorized fuel media to a mixture receiver are not operable to provide a continuous flow of odorized fuel media, determining a pressure differential between a fuel media supply configured to provide unodorized fuel media and a regulated pressurized odorant is within predetermined limits, the unodorized fuel media being combined with the regulated pressurized odorant to produce the odorized fuel media, setting a manual flow metering valve, coupled to an odorant supply, based on the pressure differential, opening a media supply injection valve coupled to the fuel media supply, to allow flow of the unodorized fuel media to the mixture receiver, opening a manual ball valve coupled to the manual flow metering valve to allow flow of the regulated pressurized odorant to the mixture receiver and closing the manual ball valve, in response to no fuel media supply pressure from the fuel media supply.

In accordance with embodiments of the present invention, a method is provided. The method includes one or more of determining one or more actuators of a system to provide odorized fuel media to a mixture receiver are not operable to provide a fixed amount of odorized fuel media, determining a pressure differential between a fuel media supply configured to provide unodorized fuel media and a regulated pressurized odorant is within predetermined limits, the unodorized fuel media being combined with the regulated pressurized odorant to produce the odorized fuel media, setting a manual flow metering valve, coupled to an odorant supply, based on the pressure differential, opening a mixture receiver valve, opening a media supply injection valve coupled to the fuel media supply, to allow flow of the unodorized fuel media to the mixture receiver, opening a manual ball valve coupled to the manual flow metering valve, to allow flow of the regulated pressurized odorant to the mixture receiver, and starting a timer that corresponds to the fixed amount of odorized fuel media. In response to the timer ends, the method includes closing the media supply injection valve and the manual ball valve, closing the mixture receiver valve, and close the manual flow metering valve.

An advantage of the present invention is it provides a method to accurately and repeatedly meter odorant into propane or gas media. Odorant concentrations must be strictly maintained in order for the odorant to be effective while not harming individuals, pets, clothing, or property.

Another advantage of the present invention is it provides an automated process to control odorant concentration and eliminate human error during a mixing process. The mixing process may be based on either flow rate or volume.

Yet another advantage of the present invention is it provides a maximum flow odorant supply loop, a reduced flow odorant supply loop, and a manual flow odorant supply loop. The maximum flow supply loop allows for great efficiency to odorize a large amount of bulk media. The reduced flow supply loop allows for great accuracy to provide a desired concentration level. The manual flow supply loop provides a backup path in case of inoperability of either of the maximum or the reduced flow loops.

Additional features and advantages of embodiments of the present invention will become more readily apparent from the following description, particularly when taken together with the accompanying drawings.

DETAILED DESCRIPTION

The present invention is directed to devices and systems for odorizing bulk propane or gas media. The devices and systems provide improved flexibility for metered concentrations of odorant within bulk propane or gas. Odorants such as Mercaptan are combined with bulk fuel media in concentrations of approximately a part per billion. Such concentrations allow the presence of otherwise odorless gases to be readily detected by individuals without harming people, animals, or property.

Figure 1:
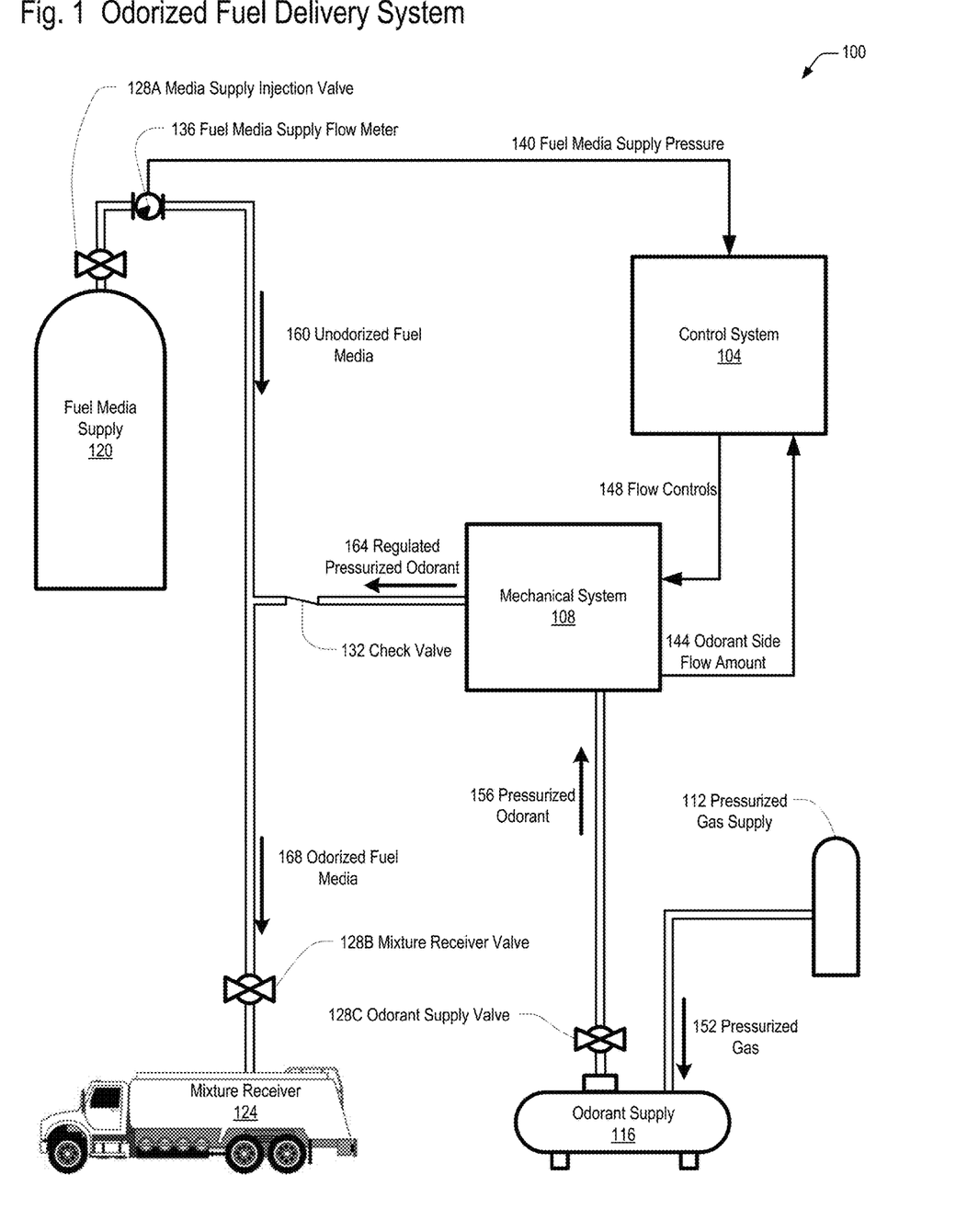
FIG. 1 is an illustration depicting an odorized fuel delivery system in accordance with embodiments of the present invention.

Referring now to FIG. 1, an illustration depicting an odorized fuel delivery system 100 in accordance with embodiments of the present invention is shown. The odorized fuel delivery system 100 may provide odorized fuel media 168 to a mixture receiver 124, which may include a propane delivery truck (shown), a propane or gas pipeline, a vessel or tank for storing odorized fuel media, or another odorized gas endpoint. Odorant stored in an odorant supply 116 may be combined with bulk propane or natural gas stored in a fuel media supply 120 and stored to the mixture receiver 124, as further described herein.

The odorized fuel delivery system 100 may include a control system 104 and a mechanical system 108 that operate cooperatively to measure flow rates and regulate pressurized odorant 164. The control system 104 is described in more detail with respect to FIG. 3 and the mechanical system 108 is described in more detail with respect to FIG. 2. The control system 104 receives a fuel media supply pressure 140 from a fuel media supply flow meter 136 and an odorant side flow amount 144 from the mechanical system 108 and in response produces flow controls 148 to the mechanical system 108. The flow controls 148 control the operation of odorant actuators within the mechanical system 108 to regulate pressurized odorant 156 flow. The mechanical system 108 receives pressurized odorant 156 from an odorant supply 116 and the flow controls 148 from the control system 104 and produces regulated pressurized odorant 164 and the odorant side flow amount 144 to the control system 104.

On the odorant supply side, a pressurized gas supply 112 is coupled to the odorant supply 116 and provides pressurized gas 152 (e.g., at 115-120 psi) at a higher pressure than the odorant supply 116. In one embodiment, the pressurized gas 152 may be nitrogen. In another embodiment, the pressurized gas 152 may be methane. The pressurized gas supply 112 typically pressurizes the odorant supply 116 to a range between 30 and 55 pounds per square inch (psi). In one embodiment, the pressurized gas supply 152 may pressure odorant in the odorant supply 116 to approximately 15-20 psi over a set pressure of the media being injected into. For example, if the fuel media supply 120 is pressurized to 100 psi (measured at the junction point of the unodorized fuel media 160 and the regulated pressurized odorant 164), the pressurized gas 152 pressures the odorant supply 116 to about 115-120 psi. This pressure differential between the fuel media supply 120 and the odorant supply 116 is what "powers" the liquid chemical movement through the system. Once pressure is blanketing the chemical in the odorant supply 116, the actuators and manual bypass in the mechanical system 108 act as an on/off control for the movement of the liquid chemical odorant.

On the media supply side, bulk propane or natural gas is stored in an unodorized state in the fuel media supply 120. There are three valves 128 shown in FIG. 1—a media supply injection valve 128A at the output of the fuel media supply 120, a mixture receiver valve 128B at the input to the mixture receiver 124, and an odorant supply valve 128C at the output of the odorant supply 116. In operation, all three valves 128 may be in an open state to allow simultaneous odorant and fuel media movement.

In one embodiment (described in more detail in FIG. 4), odorized fuel delivery may be initiated by opening media supply injection valve 128A at the fuel media supply 120. This causes flow of unodorized fuel media 160 through a gas pipe. A fuel media supply flow meter 136 measures flow of the unodorized fuel media 160 and provides a fuel media supply pressure 140 reading to the control system 104. The fuel media supply pressure 140 is a data item that reflects unodorized propane or gas flow measured by the fuel media supply flow meter 136. A processor 304 in the control system 104 detects the fuel media supply pressure 140, and depending on the fuel media supply pressure 140 may enable a flow control 148 to the mechanical system 108. Enabled flow controls 148 allow actuators 228 in the mechanical system 108 to open and allow release of regulated pressurized odorant 164 through a check valve 132 to mix with the unodorized fuel media 160. The check valve 132 allows the regulated pressurized odorant 164 to flow in one direction only, and acts as a backflow valve that prevents either the unodorized fuel media 160 or the odorized fuel media 168 flowing back into the mechanical system 108. The product of the mixture is odorized fuel media 168, which flows under pressure through valve 128B and enters the mixture receiver 124.

In one embodiment, the valves 128 may be opened and closed in sequence. For example, in one embodiment all three valves 128 are initially closed to block flow. The odorant supply valve 128C may be opened first in order to charge pressurized odorant 156 to the mechanical system 108. Next, the mixture receiver valve 128B may be opened to allow odorized fuel media 168 to flow into the mixture receiver 124. Finally, the media supply injection valve 128A may be opened to allow unodorized fuel media 160 to flow. At this point, all of valves 128A-C are opened and the mixture receiver 124 is being filled with odorized fuel media 168.

When the mixture receiver 124 has reached a desired level (e.g., full or some level below that), first the mixture receiver valve 128B is closed. This stops flow of odorized fuel media 168 into the mixture receiver 124. Next, the media supply injection valve 128A is closed to disable the flow of unodorized fuel media 160. This will thereby cause the fuel media supply flow meter 136 to report a reduced or declining fuel media supply pressure 140, which in turn causes the control system 104 to disable flow controls 148 to the mechanical system 108 and reduce or stop the flow of regulated pressurized odorant 164. At this point, the odorant supply valve 128C may be closed to stop pressurized odorant 156 from passing from the odorant supply 116 to the mechanical system 108. At this point all valves 128A-C have been closed and a mixing and transfer operation of the system 100 is completed.

Figure 2:
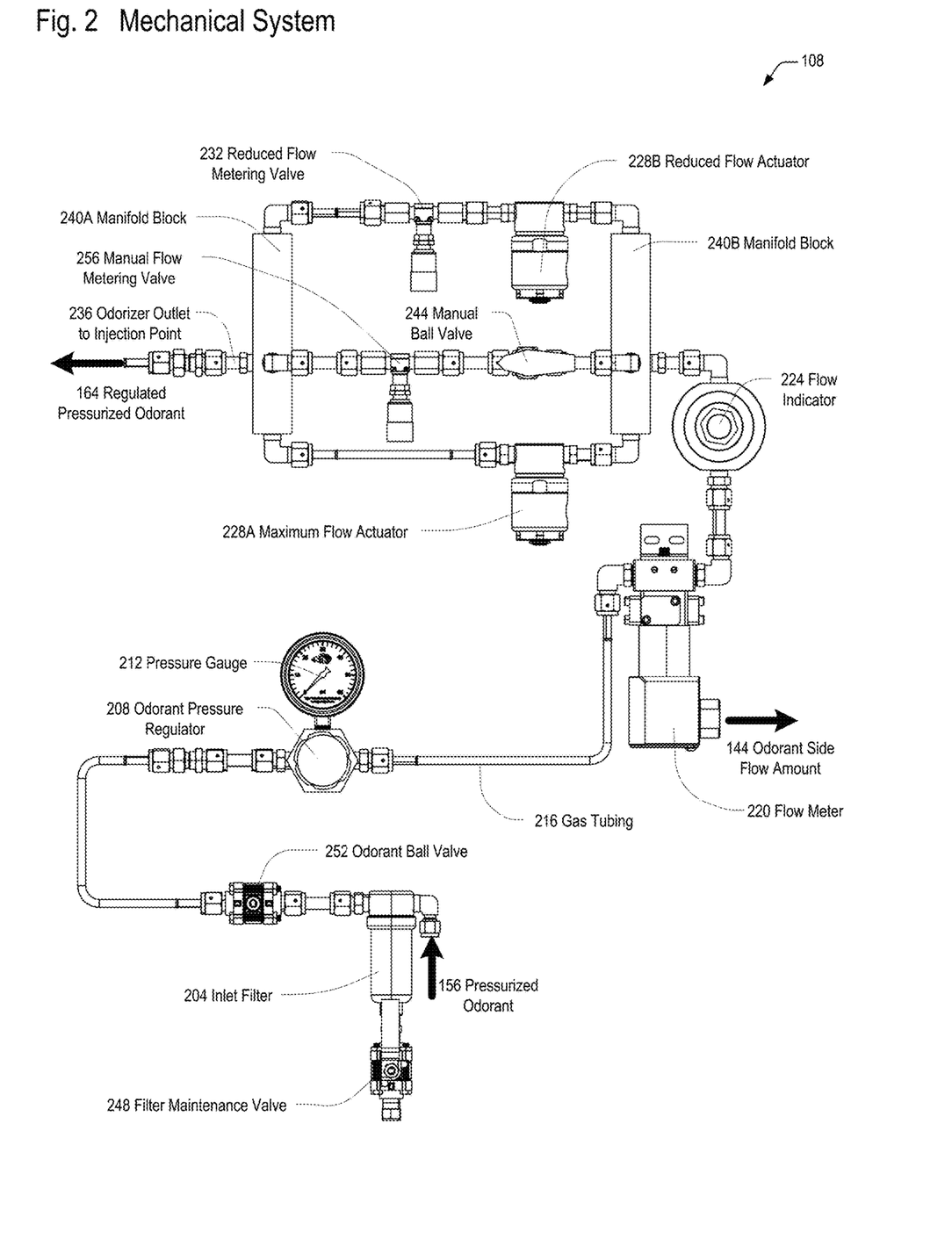
FIG. 2 is an illustration depicting a mechanical system in accordance with embodiments of the present invention.

Referring now to FIG. 2, an illustration depicting a mechanical system 108 in accordance with embodiments of the present invention is shown. The mechanical system 108 includes various pathways, actuators, and instruments for the odorant processing path. Pressurized odorant 156 is received by an inlet filter 204, which removes various impurities (e.g., rust, metal, dust, manufacturing debris, welding slag from bulk tanks and odorant transfer lines, pipe epoxy, PTFE tape, etc.) from the pressurized odorant 156. In one embodiment, a filter maintenance valve 248 may be coupled to the inlet filter 204 to allow the inlet filter 204 to be serviced. The pressurized odorant 156 passes through an odorant ball valve 252 to an odorant pressure regulator 208, which restricts flow to approximately 5 pounds per square inch (psi) over the injection vessel media pressure (i.e., the fuel media supply pressure 140) in order to maintain a higher pressure than the injection point to facilitate liquid movement. In one embodiment, the odorant pressure regulator 208 may be adjustable to account for a pressure differential between the unodorized fuel media 160 and the regulated pressurized odorant 164. Flow will proceed from the source to the mixture receiver 124 because liquids will flow from higher pressure to lower pressure. In one embodiment, a pressure gauge 212 may be coupled to the pressure regulator 208 to display a current pressure of the pressurized odorant 156 to an operator. This may allow an operator, for example, to observe a low pressure reading which may suggest the pressurized gas supply 112 needs to be replaced.

The pressurized odorant 156 passes through gas tubing 216 and may be sampled by a flow meter 220. The flow meter 220 measures the flow rate of the pressurized odorant 156, and generates an odorant side flow amount 144 data reading to the control system 104. Next, the pressurized odorant 156 passes through a flow indicator 224, which an operator may observe to verify that pressurized odorant 156 is currently flowing. For example, if an operator believes that pressurized odorant 156 should be flowing but the flow indicator 224 reflects no flow, this may suggest that either the odorant supply valve 128C is closed, the pressurized gas supply 112 is out of nitrogen or methane, or the odorant supply 116 may be empty.

From the flow indicator 224, the pressurized odorant 156 passes to two or more actuators 228 and a manual bypass loop. In the preferred embodiment, there may be two actuators 228 in the mechanical system 108: a maximum flow actuator 228A and a reduced flow actuator 228B. In other embodiments there may be other actuators 228 present that may regulate pressurized odorant 156 flow in other ways. In one embodiment, the maximum flow actuator 228A and the reduced flow actuator 228B may be solenoids. Solenoids are electronically controlled valves that are controlled by the processor of the control system 104. Other forms of electronic actuators knows in the art may be used as alternatives to solenoids. The maximum flow actuator 228A functions as a switch that is controlled by one of the flow controls 148. When the corresponding flow control 148 is enabled, the maximum flow actuator 228A allows the pressurized odorant 156 to flow at a maximum pressure level to an odorizer outlet to an injection point 236. The injection point 236 is a location at which the regulated pressurized odorant 164 is introduced to and mixed with unodorized fuel media 160. In one embodiment, the maximum pressure level may be the pressure level of the odorant supply 116. The reduced flow actuator 228B functions as a switch that is controlled by another of the flow controls 148. When the corresponding flow control 148 is enabled, the reduced flow actuator 228B allows the pressurized odorant 156 to flow at a reduced pressure level to an odorizer outlet to the injection point 236. In one embodiment, the reduced flow rate may be determined by a metering valve 232 in the same reduced flow portion of the mechanical system 108 as the reduced flow actuator 228B. In one embodiment, the metering valve 232 may be manually set during installation (e.g., to a predetermined % of the maximum flow rate through the maximum flow actuator 228A, such as 10%).

To set the metering valve 232 correctly, the metering valve 232 is initially closed completely. An operator may then activate a control on the control system 104 to select a flow control 148 that enables only the reduced flow actuator 228B. The operator may manually open the metering valve 232 until the odorant has enough of a flow rate as measured by the metering valve 232 to meet the user's injection needs (i.e., to produce a desired concentration given the fuel media supply pressure 140). The operator then inactivates the control on the control system 104 to deselect the flow control 148 for the reduced flow actuator 228B. This causes the flow of regulated pressurized odorant 164 to stop. With the metering valve 232 now set, the operator may place the control system 104 in a normal automatic flow-based operating mode where the flow controls 148 are controlled by the fuel media supply pressure 140 from fuel media supply flow meter 136.

In one embodiment, the mechanical system 108 may also include a manual bypass loop. The manual bypass loop allows an operator to manually produce a desired concentration of odorant to the odorizer outlet to the injection point 236. This may be needed if power is lost to the control system 104 and actuators 228 or one or more actuators 228 fail or behave erratically. The manual bypass loop includes a manual ball valve 244 and a manual flow metering valve 256. Operation of the manual bypass loop is described in detail in FIGS. 7 and 8 and the accompanying description.

Given the triple path structure of the present invention, the system 100 will always have redundancy. The second (high flow) injection leg does not have or require an associated metering valve 232. During operation, if the odorant flow rate is not high enough to meet injection standards using the initial metering valve 232 test, the control system 104 may activate the maximum flow actuator 228A (with a flow control signal 148) to open and accommodate accurate injection rates. In another embodiment, a metering valve 232 may be set with a motor encoder combination that may be programmed and controlled by the control system 104.

In one embodiment, the desired concentration may be ½ lb. of odorant per 1 million standard ft.$^3$ of unodorized media. In one embodiment, the metering valve 232 may be set to a flow of approximately 10% of a maximum odorant flow rate through the maximum flow actuator 228A. In one embodiment, the maximum flow actuator 228A may be enabled at the same time or a different time as the reduced flow actuator 228B. Typically, a fuel mixing and transfer operation is performed in one of two ways. A flow rate-based process is shown and described with respect to FIG. 4 while a volume-based process is shown and described with respect to FIG. 5.

Figure 3:
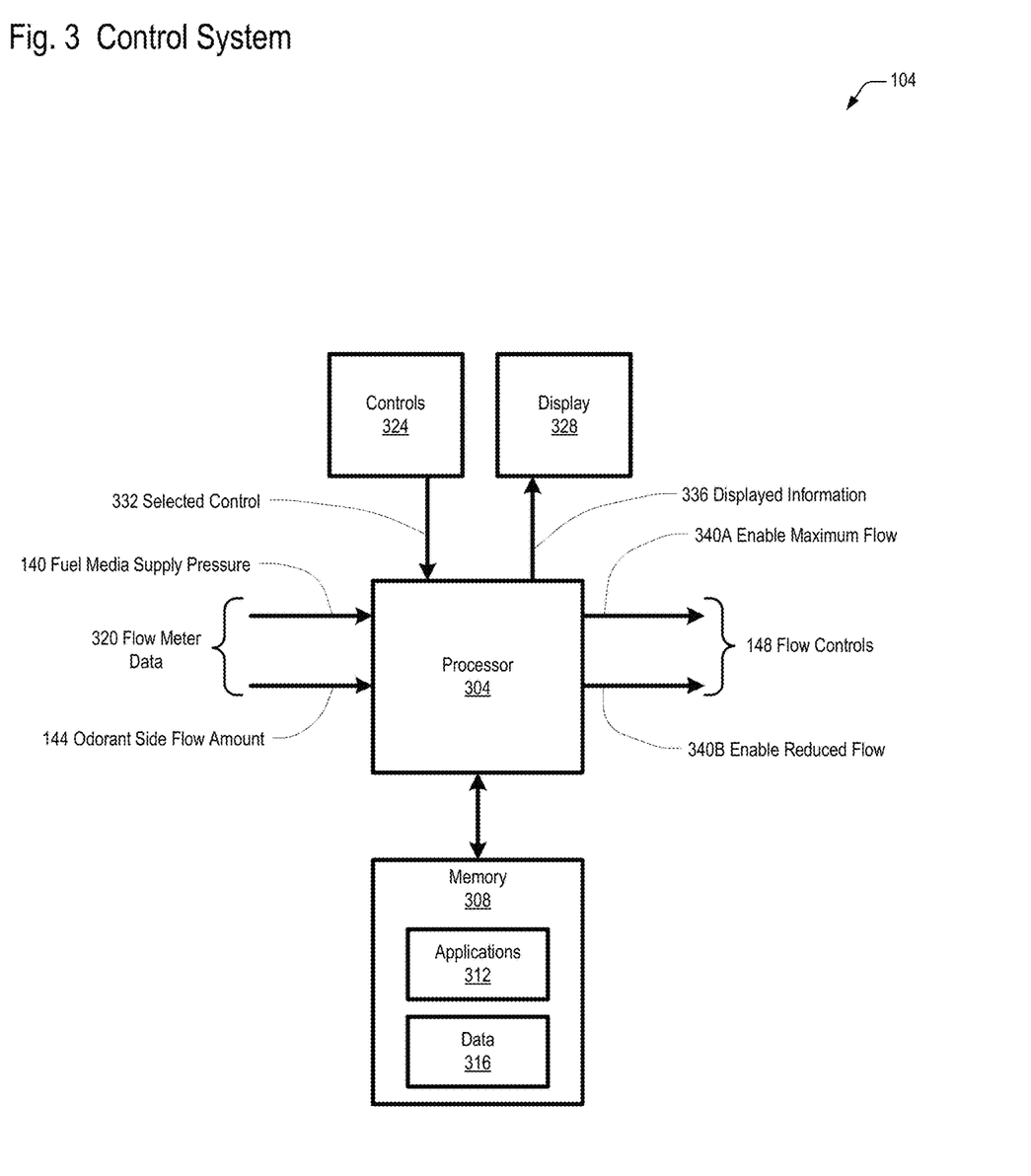
FIG. 3 is an illustration depicting a control system in accordance with embodiments of the present invention.

Referring now to FIG. 3, an illustration depicting a control system 104 in accordance with embodiments of the present invention is shown. The control system 104 may include one or more processors 304 and one or more memory devices 308, although a single processor 304 and memory device 308 are shown in FIG. 3. Processors 304 may include any processors know in the art, including microprocessors, microcontrollers, field-programmable gate arrays (FPGAs), or any other form of hardware or software processors. Memory 308 may include any combination of volatile or non-volatile memories known in the art, and may store one or more software applications 312 and associated data 316. In one embodiment, the processor 304 may be a programmable logic controller (PLC).

In one embodiment, the control system 104 may include one or more controls 324 and a display 328. The controls 324 provide a selected control 332 signal to the processor 304 and may allow an operator to power-on/off the control system 104, switch between manual and automatic operating modes, enter media and/or odorant volumes, flow rates, and/or operating times, and manually enable/disable actuators 228A/228B. The controls 324 may include a numeric keypad, an alphanumeric keyboard, and/or individual selection buttons or other controls. The display 328 receives displayed information 336 from the processor 304 and may provide individual numeric or alphanumeric indicators and/or a display panel such as an LCD panel. In one embodiment, the LCD panel may include a touchscreen feature that may allow the display 328 to also include the controls 324. The displayed information 336 may indicate an on/off status of the control system 104, a detected fault, a manual/automatic operating mode, a current setting for the metering valve 232, a reading of the pressure gauge 212, a manual enable/disable status of the actuators 228A/228B, the fuel media supply pressure 140, the odorant side flow amount 144, open/closed status of valves 128, volume of odorized propane or natural gas provided to a current mixture receiver 124, and/or volume of odorized propane or natural gas remaining to be provided to the mixture receiver 124. The display 328 may additionally show an operator any of power status, operating status, flow rates, gas or odorant volumes, elapsed time, remaining time, temperatures, malfunctions/failures, and the like.

One or more applications 312 are stored in the memory 308 and executed by the processor 304 to generate the flow controls 148. The flow controls 148 may include an enable maximum flow 340A signal and an enable reduced flow 340B signal. The enable maximum flow 340A signal controls the maximum flow actuator 228A and the enable reduced flow 340B signal controls the reduced flow actuator 228B. The processor 304 receives flow meter data 320, which may include the fuel media supply pressure 140 and the odorant side flow amount 144. The processor 304 may store the fuel media supply pressure 140, the odorant side flow amount 144, selected controls 332, and current flow controls 148 as data 316 in the memory 308.

In one embodiment, the control system 104 may include other components not specifically shown and described herein. For example, the control system 104 may include one or more controls for various purposes, including but not limited to: powering the control system 104 or specific control system 104 components, opening or closing any of valves 128, initiating operation of the fuel delivery system 100, terminating operation of the fuel delivery system 100, enabling or disabling any of the flow controls 148, entering operator identifiers and/or passwords, entering timer values, and the like.

In one embodiment, the control system 104 may include other components to communicate remotely to receive or provide data through network interface(s). The network interfaces may be of any type, including but not limited to Ethernet, Wi-Fi, Bluetooth, RS-232, RS-422, and the like. In one embodiment, the controls 324 and displayed information 328 may be accessed remotely by an application running on a remote computer (e.g., desktop, server, or portable computer, smartphone, smartwatch, etc.) that accesses the control system 104 over a wired or wireless connection.

Figure 4:
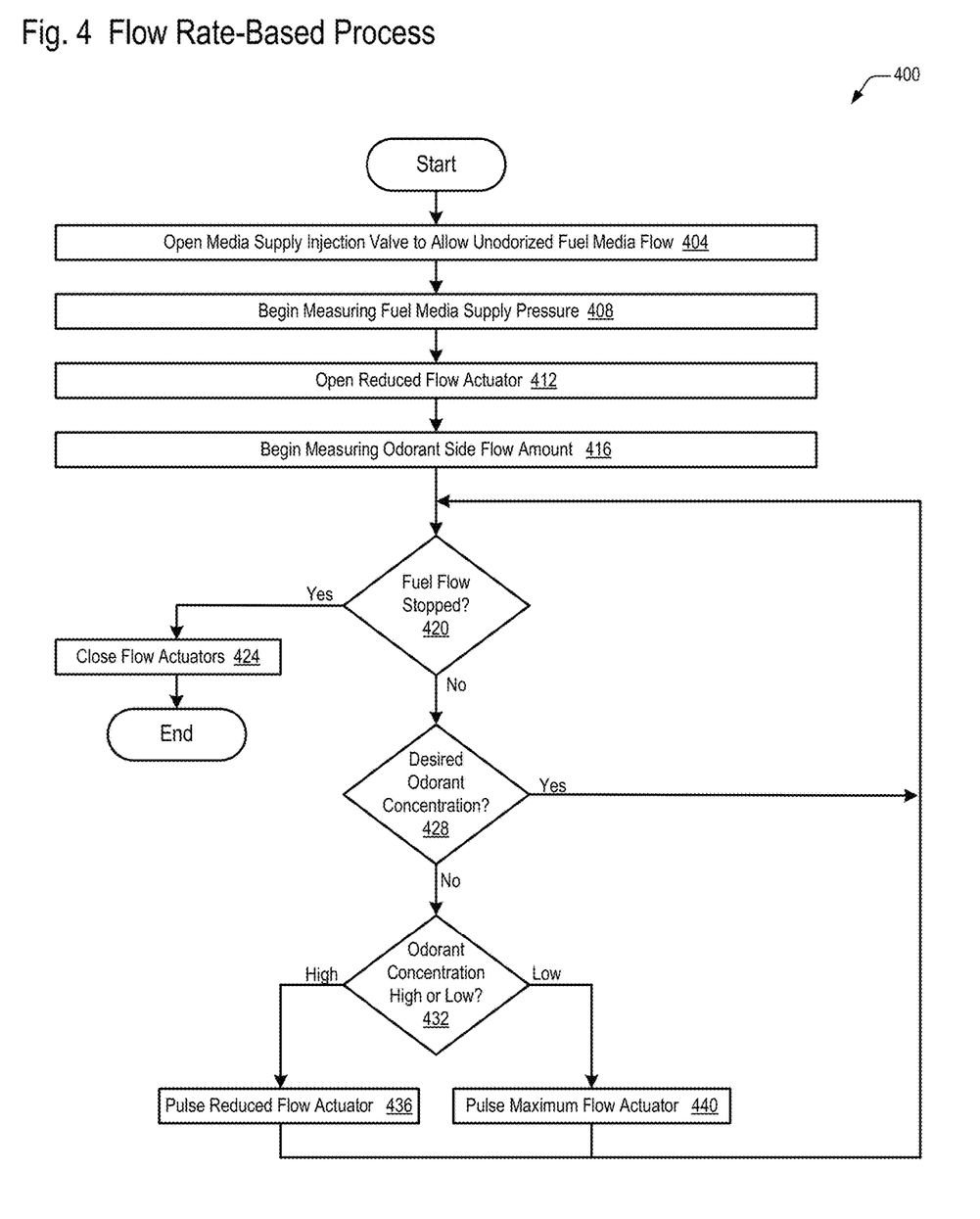
FIG. 4 is a flowchart depicting a flow rate-based process in accordance with embodiments of the present invention.

Referring now to FIG. 4, a flowchart depicting a flow rate-based process 400 in accordance with embodiments of the present invention is shown. The flow rate-based process 400 shows operation steps for a primary embodiment of the present application. Flow begins at block 404.

At block 404, a media supply injection valve 128A is opened to allow unodorized fuel media 160 to flow to a mixture receiver 124. Prior to this point, both the maximum flow actuator 228A and the reduced flow actuator 228B are preferably closed. The unodorized fuel media 160 is stored in a fuel media supply 120 and passes through the media supply injection valve 128A and a fuel media supply flow meter 136. Flow continues to block 408.

At block 408, the fuel media supply pressure 140 is continually measured. The fuel media supply flow meter 136 outputs the fuel media supply pressure 140 signal to the control system 104 as flow meter data 320 to the processor 304. With the media supply injection valve 128A opened, a positive fuel media supply pressure 140 is reported to the processor 304. Flow continues to block 412.

At block 412, the reduced flow actuator 228B is opened. This allows pressurized odorant 156 to flow through the inlet filter 204, the pressure regulator 208, the gas tubing 216, the flow meter 220, the flow indicator 224, the reduced flow actuator 228B, the metering valve 232 and the odorizer outlet to injection point 236 as regulated pressurized odorant 164. In one embodiment, the processor 304 may enable a reduced flow signal 340B as a flow control 148 to the reduced flow actuator 228B in response to receiving a positive fuel media supply pressure 140, without any additional comparison. In another embodiment, in response to receiving a positive fuel media supply pressure 140 from the fuel media supply flow meter 136, the processor 304 may compare the fuel media supply pressure 140 to a reduced flow threshold stored in the data 316. If the fuel media supply pressure 140 is greater than or equal to the reduced flow threshold, the processor 304 may generate the enable reduced flow 340B signal. If the fuel media supply pressure 140 is initially too low to trigger the enable reduced flow signal 340B, if the fuel media supply pressure 140 increases above the reduced flow threshold, the processor 304 may enable the reduced flow signal 340B. Flow continues to block 416.

At block 416, the odorant side flow amount 144 is measured. The flow meter 220 outputs the odorant side flow amount 144 signal as flow meter data 320 to the processor 304. A positive value odorant side flow amount 144 is produced by the flow meter 220 in response to the reduced flow actuator 228B is opened and the metering valve 232 is set to allow a positive odorant flow. Flow continues to decision block 420.

At decision block 420 the processor 304 determines if the fuel flow is stopped. Fuel flow is stopped if the processor 304 observes a zero fuel media supply pressure 140 from the fuel media supply flow meter 136. This may indicate there is no more flow of unodorized fuel media 160 through the fuel media supply flow meter 136 due to the media supply injection valve 128A becoming closed or the fuel media supply 120 being empty. In one embodiment, the fuel media supply pressure 140 may not stop, but may fall below a fuel flow low threshold stored in data 316. The processor 304 may compare the fuel media supply pressure 140 to the fuel flow low threshold. If the fuel media supply pressure 140 falls below the fuel flow low threshold, the processor 304 may determine the flow of unodorized fuel media 160 has (effectively) stopped. Flow continues to block 424 if the processor 304 determines the fuel flow is stopped and proceeds to decision block 428 if the processor 304 determines the fuel flow is not stopped.

At block 424, the processor 304 closes the maximum flow actuator 228A and the reduced flow actuator 228B. The processor 304 closes the maximum flow actuator 228A by disabling the enable maximum flow 340A signal and closes the reduced flow actuator 228B by disabling the enable reduced flow 340B signal. With both actuators 228A, 228B now closed, the flow of regulated pressurized odorant 164 is disabled. Flow ends at block 424.

At decision block 428, the processor 304 determines if there is a desired odorant concentration in the odorized fuel media 168. The processor 304 compares the odorant side flow amount 144 to the fuel media supply pressure 140 to determine the odorant concentration. In one embodiment, a desired odorant concentration may be ½ lb. of odorant per 1 million standard ft.$^3$ of unodorized fuel media 160. In another embodiment, a desired odorant concentration may be within a range of ½ lb. of odorant per 1 million standard ft.$^3$ of unodorized fuel media 160. The range may be a predetermined amount or percentage difference from ½ lb. of odorant per 1 million standard ft.$^3$ of unodorized fuel media 160 (e.g., 1.49-1.51 lb of odorant, +/−0.5% difference from the ½ lb. of odorant nominal value, etc.). Specific range values are known in the art as being affective for the distribution of odorized fuel media 168. If the desired odorant concentration has been reached, then flow proceeds to decision block 420. If the desired odorant concentration has not been reached (i.e., the odorant concentration is either too high or too low), then flow proceeds to decision block 432.

At decision block 432, the processor 304 determines if the odorant concentration is high or low. The odorant concentration may be stable, increasing, or decreasing. The processor 304 may calculate odorant concentration at either regular or varying intervals while there is a positive flow of regulated pressurized odorant 164. In one embodiment, the processor 304 may calculate odorant concentration every half second, every second, every 10 seconds, or every minute, for example. In another embodiment, the processor 304 may calculate odorant concentration at time intervals based on a calculated difference from a nominal concentration value (e.g., ½ lb. of odorant per 1 million standard ft.$^3$ of unodorized fuel media 160). For example, odorant concentration may be measured every minute for concentrations within 0.1% of a nominal value, every 10 seconds for concentrations within 0.5%-0.1% of the nominal value, and every second for concentrations >0.5% of the nominal value.

In a continuous flow environment (not-batching), if the odorant concentration is too high, the processor 304 may temporarily disable the flow controls 148 (thus disabling the maximum flow actuator 228A and the reduced flow actuator 228B) until a quantity of unodorized fuel media 160 has passed the odorized outlet to the injection point 236. The processor 304 continuously monitors the fuel media supply pressure 140 from the fuel media supply flow meter 136, and calculates the odorant concentration. With the unodorized fuel media 160 continuing to flow and the regulated pressurized odorant now inhibited, the odorant concentration decreases in the odorized fuel media 168. When the proper odorant concentration has been reached, the processor 304 may enable the reduced flow actuator 228B.

In a batching environment, the odorant concentration may be monitored and adjusted as shown in FIG. 4. If the processor 304 determines the odorant concentration is too high, then the processor 304 may need to reduce the odorant concentration and flow proceeds to block 436. If the processor 304 determines the odorant concentration is too low, then the processor 304 needs to increase the odorant concentration and flow proceeds to block 440.

At block 436, the processor 304 pulses the reduced flow actuator 228B. Pulsing the reduced flow actuator 436 reduces the average odorant flow rate through the reduced flow actuator 228B, thereby increasing the odorant concentration at a slower rate. In one embodiment, the processor 304 may alternate the enable reduced flow 340B signal between an enabled state and a disabled state at a fixed duty cycle (e.g., 50%), as shown and described in FIG. 6. In another embodiment, the processor 304 may alternate the enable reduced flow 340B signal between an enabled state and a disabled state at a variable duty cycle (e.g., 10-50%), based on a difference between a calculated odorant concentration and a nominal concentration value. For example, the processor 304 may pulse the reduced flow actuator 228B at a 10% duty cycle for a difference between the calculated odorant concentration and the nominal odorant concentration of 0.1% or less, at a 20% duty rate for a difference of 0.5%-0.1%, and at a 50% duty cycle for a difference >0.5%. Flow proceeds to decision block 420 to determine if the fuel flow is stopped.

At block 440, the processor 304 pulses the maximum flow actuator 228A. Pulsing the maximum flow actuator 440 increases the average odorant flow rate and therefore, the odorant concentration. When the processor 304 pulses the maximum flow actuator 228A, the odorant concentration increases faster than when the reduced flow actuator 228B is pulsed. In one embodiment, the processor 304 alternates the enable maximum flow 340A signal between an enabled state and a disabled state at a fixed duty cycle (e.g., 50%), as shown and described in FIG. 6. In another embodiment, the processor 304 alternates the enable maximum flow 340A signal between an enabled state and a disabled state at a variable duty cycle (e.g., 10-50%), based on a difference between a calculated odorant concentration and a nominal concentration value. For example, the processor 304 may pulse the maximum flow actuator 228A at a 10% duty cycle for a difference between the calculated odorant concentration and the nominal odorant concentration of 0.1% or less, at a 20% duty rate for a difference of 0.5%-0.1%, and at a 50% duty cycle for a difference >0.5%. Flow proceeds to decision block 420 to determine if the fuel flow is stopped.

Figure 5:
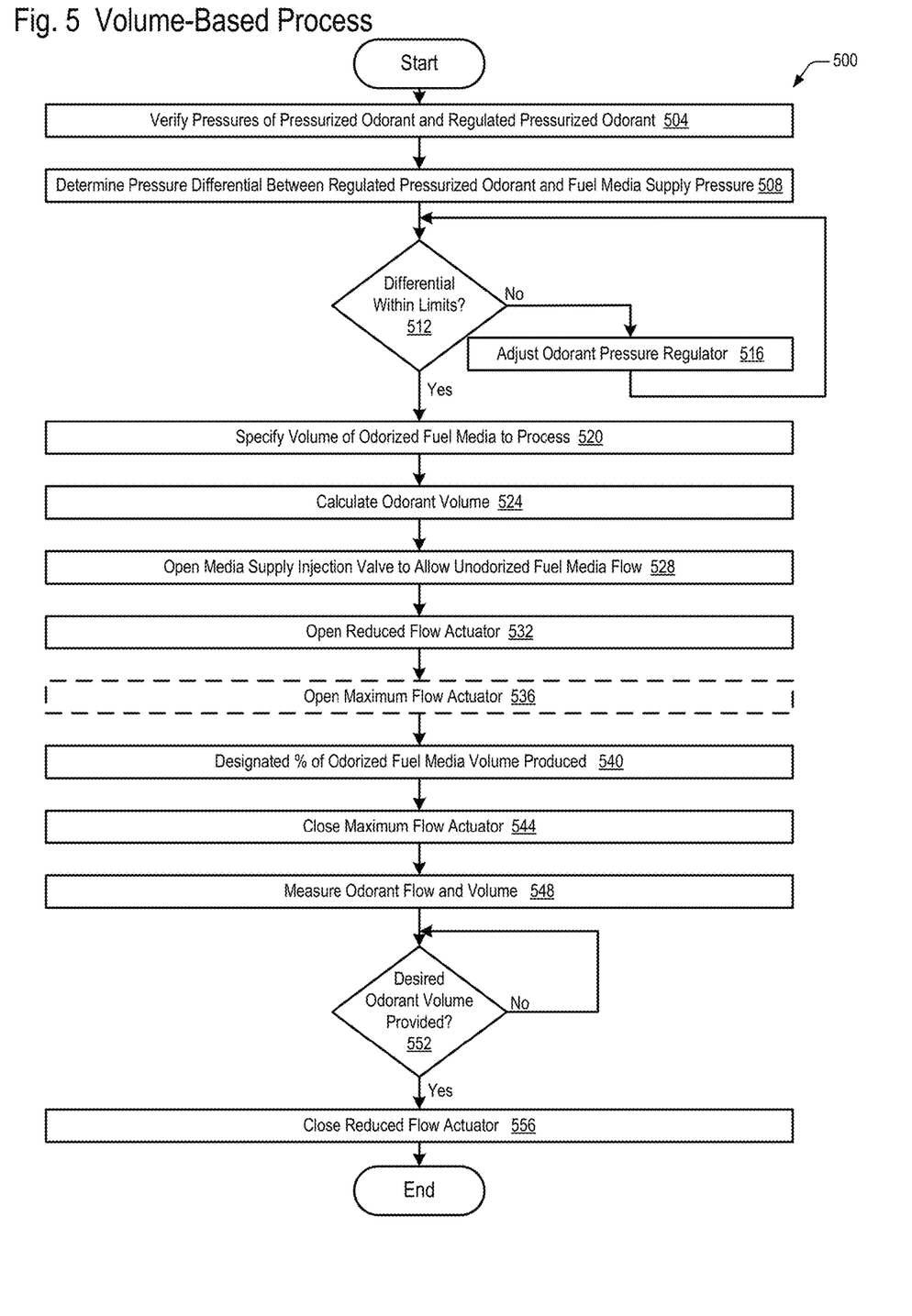
FIG. 5 is a flowchart depicting a volume-based process in accordance with embodiments of the present invention.

Referring now to FIG. 5, a flowchart depicting a volume-based process 500 in accordance with embodiments of the present invention is shown. The volume-based process 500 shows operation steps for a secondary embodiment of the present application. Flow begins at block 504.

At block 504, the processor 304 or an operator of the system 100 verifies pressures of pressurized odorant 156 and regulated pressurized odorant 164. Pressurized odorant 156 may be read on the pressure gauge 212 while the regulated pressurized odorant 164 may be based on the actuators 228 being enabled or disabled. Flow proceeds to block 508.

At block 508, a pressure differential is determined between the regulated pressurized odorant 164 and the fuel media supply pressure 140. The pressure differential determines the odorant concentration in the odorized fuel media 168. Flow proceeds to decision block 512.

At decision block 512, a determination is made if the pressure differential determined in block 508 is within specified limits that correspond with an acceptable odorant concentration range. If the pressure differential is not within the limits, then flow proceeds to block 516. If the pressure differential is within the limits, then flow proceeds to block 520.

At block 516, the odorant pressure regulator 208 is adjusted. If decision block 512 determined the differential was not within limits and the differential was above a high limit, the odorant pressure regulator 208 is adjusted downward. If decision block 512 determined the differential was not within limits and the differential was below a low limit, the odorant pressure regulator 208 is adjusted upward. Flow proceeds to decision block 512 to check if the pressure differential is now within limits, based on the adjustment performed in block 516.

At block 520, a volume of bulk or odorized media to process is specified. In one embodiment, an operator may enter the volume to be odorized on a control panel of the control system 104, using controls 324 and/or display 328. In another embodiment, an operator may enter the volume to be odorized on a remote computing device connected to the processor 304 through a wired or wireless network interface, and the remote computing device may provide the volume to the processor 304. In another embodiment, a server or other remote computing device may provide the volume to be odorized to the processor 304 through the wired or wireless network interface. In one embodiment, the volume of fuel media to process may correspond to a volume of the fuel media supply 120. In another embodiment, the volume of fuel media to process may correspond to a volume of a mixture receiver 124. In another embodiment, the volume of fuel media to process may correspond to a desired volume of odorized media to add to a mixture receiver 124. Flow proceeds to block 524.

At block 524, the processor 304 calculates an odorant volume. The odorant volume 524 may be based on a desired concentration of odorant within the odorized fuel media 168, such as ½ lb. of odorant per 1 million standard ft.$^3$ of unodorized fuel media 160. In one embodiment, the processor 304 may calculate the odorant volume by multiplying the volume of fuel media to process from block 520 by the desired concentration. Flow proceeds to block 528.

At block 528, the media supply injection valve 128A is opened to allow unodorized fuel media 160 flow. In one embodiment, an operator may manually open the media supply injection valve 128A. Flow proceeds to block 532.

At block 532, the reduced flow actuator 228B is opened. The processor 304 transmits the enable reduced flow 340B signal to the reduced flow actuator 228B, and in response the reduced flow actuator 228B opens and allows odorant to flow through the reduced flow metering valve 232. This allows the reduced odorant flow as regulated pressurized odorant 164. Flow continues to optional block 536 and block 540.

At optional block 536, the maximum flow actuator 228A is opened. The processor 304 transmits the enable maximum flow 340A signal to the maximum flow actuator 228A, and in response the maximum flow actuator 228A opens and allows odorant to flow. Enabling the maximum flow actuator 228A as well as the reduced flow actuator 228B allows the most odorant flow through the system as regulated pressurized odorant 164. Flow continues to block 540.

At block 540, the maximum flow actuator 228A may be open if optional block 536 was executed or the maximum flow actuator 228A may be closed if optional block 536 was not executed. At block 540, a designated percentage of unodorized fuel media 160 or odorized fuel media 168 volume is produced. In one embodiment, the designated percentage may be close to the volume specified in block 520. For example, the designated percentage may be 90% of the volume required. The designated percentage may be any value, but is preferably chosen in order to maximize odorization efficiency for the current batch/volume while preventing volume overrun through the maximum flow actuator 228A. In one embodiment, the designated percentage of unodorized fuel media 160 or odorized fuel media 168 volume may depend on the volume of a mixture receiver 124. For example, it may be desirable to only fill a delivery truck 124 to a less than full capacity (e.g., 30%) because of a purchased volume not needing the entire capacity of the delivery truck 124. Flow continues to block 544.

At block 544, the processor 304 closes the maximum flow actuator 228A by disabling the enable maximum flow 340A signal. With the maximum flow actuator 228A now closed/disabled, the only continuing odorant flow is due to the reduced flow actuator 228B. Flow continues to block 548.

At block 548, the processor 304 measures odorant flow and volume. The mechanical system 108 may include a flow meter 220 that produces an odorant side flow amount 144 and an odorant volume to the processor 304. Flow continues to decision block 552.

At decision block 552, the processor 304 determines if a desired odorant volume 520 has been provided. In another embodiment, the processor 304 may compare the received odorant side flow amount 144 and an odorant volume from the flow meter 220 and compare to a desired odorant volume 520. For example, the desired odorant volume 520 may be stored as data 316 for batches of odorized fuel media 168 of a standard size. As another example, given a known desired odorant concentration level, the processor 304 may determine the desired odorant volume by multiplying the volume of odorized media to process from block 520 by the known desired odorant concentration level. If the desired odorant volume has not been provided, then flow proceeds to decision block 552 to continue checking. If the desired odorant volume has been provided, then flow proceeds to block 556.

At block 556, the desired odorant volume has been provided and the processor 304 closes the reduced flow actuator 228B by disabling the enable reduced flow 340B signal. With both the reduced flow actuator 228B and the maximum flow actuator 228A now closed/disabled, no odorant continues to flow in the system and the volume-based process is now completed. Flow ends at block 556.

Although FIG. 4 did not illustrate steps to verify/set the differential pressure at the beginning of the process, in some embodiments these steps (blocks 504-516) may be performed prior to block 404 of FIG. 4.

Figure 6:
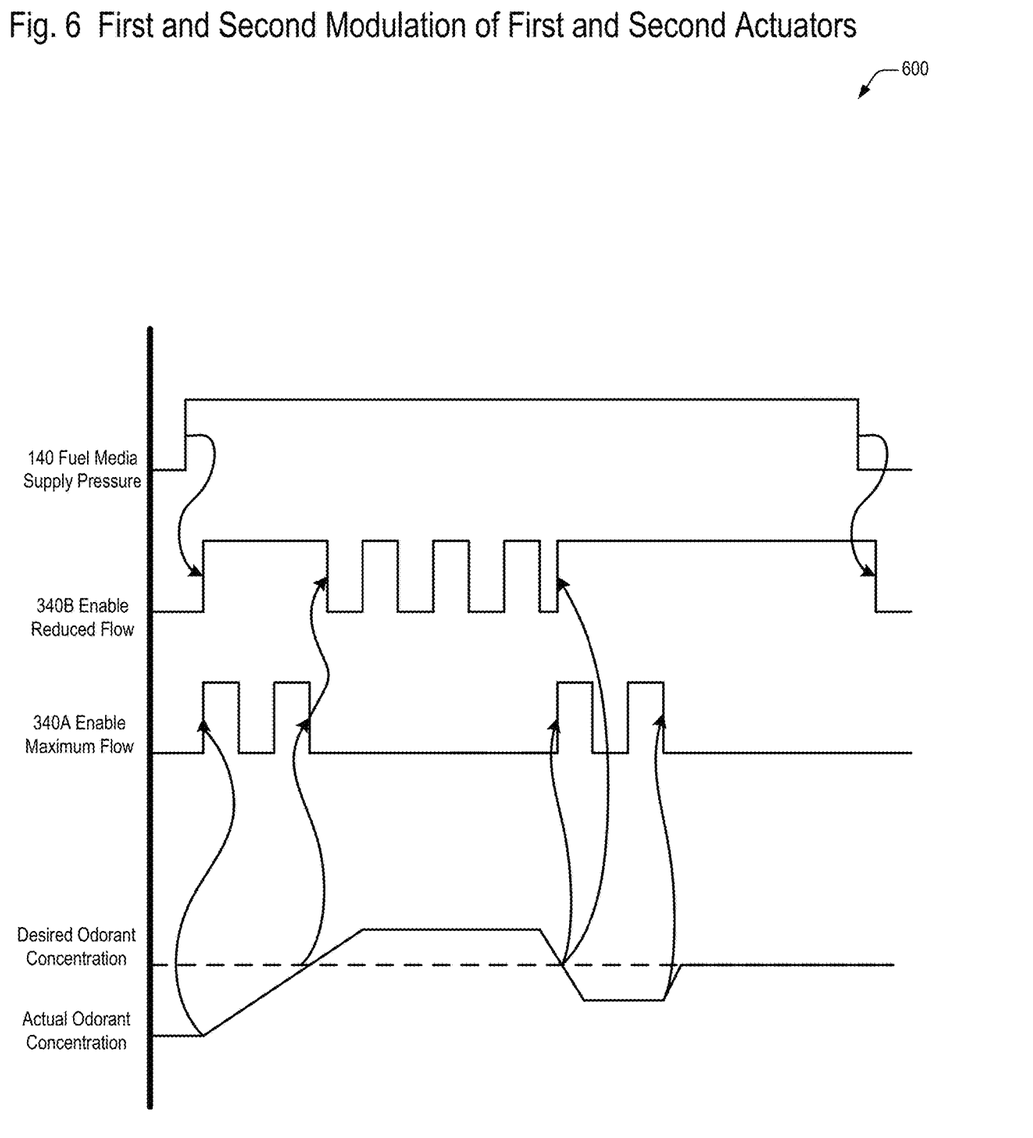
FIG. 6 is an exemplary illustration depicting first and second modulation of first and second actuators in accordance with embodiments of the present invention.

Referring now to FIG. 6, an exemplary illustration 600 depicting a first and second modulation of first and second actuators in accordance with embodiments of the present invention is shown. The first and second modulations apply when the odorant concentration is not at a desired level or within a desired range. The first modulation is applied to the first actuator (i.e., the maximum flow actuator 228A) when the odorant concentration is too low. The second modulation is applied to the second actuator (i.e., the reduced flow actuator 228B) when the odorant concentration is too high. The control system 104 continuously calculates odorant concentration in the odorized fuel media 168. The odorant concentration is based on a ratio of the fuel media supply pressure 140 compared to the odorant side flow amount 144.

In one embodiment, the media supply injection valve 128A is open and the fuel media supply flow meter 136 detects a positive flow side fuel amount 140. The processor 304 receives the fuel media supply pressure 140 and enables the reduced odorant flow 340B signal to the reduced flow actuator 228B. This causes a reduced flow of odorant to the odorized fuel media 168.

The processor 304 determines the actual odorant concentration, as discussed herein, and compares the actual odorant concentration to a desired odorant concentration stored in data 316. In the presented example, the actual odorant concentration may be less than the desired odorant concentration. The processor 304 enables the maximum flow signal 340A and enables the maximum flow actuator 228A with the first modulation. In the presented example, the first modulation may have a fixed duty cycle and period that selectively enables and disables the maximum flow actuator 228A. The processor 304 may continue to monitor and calculate the actual odorant concentration while the first modulation is occurring. The processor 304 may determine the actual odorant concentration is increasing and may become equal to the desired odorant concentration. At that point, the processor 304 may discontinue the first modulation.

The actual odorant concentration may continue to increase to a level that is greater than the desired odorant concentration. The processor 304 may enable the second modulation by enabling the reduced flow signal 340B to the reduced flow actuator 228B with the second modulation. In the presented example, the second modulation may have a fixed duty cycle and period that selectively enables and disables the reduced flow actuator 228B. The processor 304 may continue to monitor and calculate the actual odorant concentration while the second modulation is occurring. The processor 304 may determine the actual odorant concentration is decreasing and may become equal to the desired odorant concentration. At that point, the processor 304 may discontinue the second modulation.

The actual odorant concentration may continue to decrease to a level that is equal to the desired odorant concentration. The processor 304 may discontinue the second modulation by returning the reduced flow signal 340B to the reduced flow actuator 228B with an "on" or enabled state as long as the fuel media supply pressure 140 is still positive.

In the illustrated example, the actual odorant concentration may continue to decrease to a level that is less than the desired odorant concentration. The processor 304 may continue the first modulation by asserting the maximum flow signal 340A to the maximum flow actuator 228A. This may cause the actual odorant concentration to a point at which it is again equal to the desired odorant concentration. The processor 304 disables the first modulation, thus disabling the maximum flow signal 340A.

With the actual odorant concentration equal to the desired odorant concentration, both the first and the second modulations are disabled. The enable reduced flow 340B signal remains asserted to the reduced flow actuator 228B, and therefore odorant is being produced to the odorized fuel media 168 as long as the fuel media supply pressure 140 is positive. At some point, the fuel media supply pressure 140 reduces to reflect a zero flow rate. For example, an operator may close the media supply injection valve 128A. The processor 304, in response, disables the enable reduced flow 340B signal to the reduced flow actuator 228B, and the mixture operation is completed.

Figure 7:
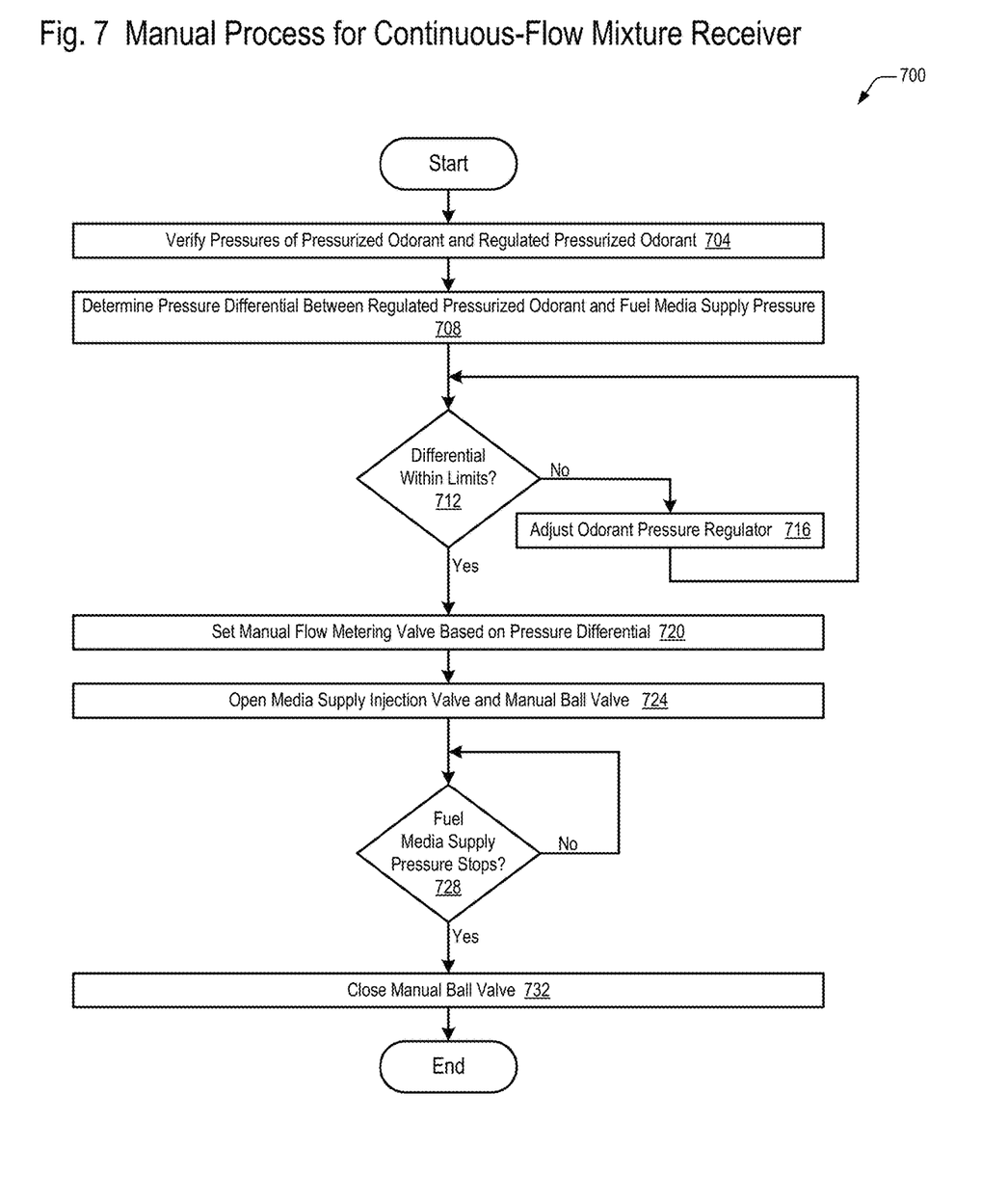
FIG. 7 is a flowchart depicting a manual process for a continuous-flow mixture receiver in accordance with embodiments of the present invention.

Referring now to FIG. 7, a flowchart illustrating a manual process 700 for a continuous-flow mixture receiver is shown. Manual processes of FIG. 7 and FIG. 8 may be used anytime, but may be most useful during a power outage to the system or a failure of actuators 228 or other components of the control system 104. Flow begins at block 704.

At block 704, the processor 304 or an operator of the system 100 verifies pressures of pressurized odorant 156 and regulated pressurized odorant 164. Pressurized odorant 156 may be read on the pressure gauge 212 while the regulated pressurized odorant 164 may be based on the actuators 228 being enabled or disabled. Flow proceeds to block 708.

At block 708, a pressure differential is determined between the regulated pressurized odorant 164 and the fuel media supply pressure 140. The pressure differential determines the odorant concentration in the odorized fuel media 168. Flow proceeds to decision block 712.

At decision block 712, a determination is made if the pressure differential determined in block 708 is within specified limits that correspond with an acceptable odorant concentration range. If the pressure differential is not within the limits, then flow proceeds to block 716. If the pressure differential is within the limits, then flow proceeds to block 720.

At block 716, the odorant pressure regulator 208 is adjusted. If decision block 712 determined the differential was not within limits and the differential was above a high limit, the odorant pressure regulator 208 is adjusted downward. If decision block 712 determined the differential was not within limits and the differential was below a low limit, the odorant pressure regulator 208 is adjusted upward. Flow proceeds to decision block 712 to check if the pressure differential is now within limits, based on the adjustment performed in block 716.

At block 720, the manual flow metering valve 256 is set based on the pressure differential determined in block 708. The setting may be based on details of actual designed systems, and is therefore system-dependent. Flow proceeds to block 724.

At block 724, the media supply injection valve 128A is opened, initiating unodorized fuel media 160 flow through the fuel media supply flow meter 136 to the mixture receiver 124. The manual ball valve 244 is concurrently opened, initiating flow of pressurized regulated odorant 164 to the mixture receiver 124. Flow proceeds to decision block 728.

At decision block 728, a determination is made if the fuel media pressure stops or drops to a near-zero value. For example, an operator of the system 100 may view the fuel media supply flow meter 136 and observe a zero or near-zero reading. A zero or near zero reading may reflect the fuel media supply 120 is empty or needs to be replaced. If the fuel media supply pressure stops, then flow proceeds to block 732. If the fuel media supply pressure does not stop or almost stopped, then flow proceeds to decision block 728 to continue to check for stopped or near-zero fuel media pressure.

At block 732, the fuel media pressure is stopped or nearly stopped. An operator of the system 100 closes the manual ball valve 244. Flow ends at block 732.

Figure 8:
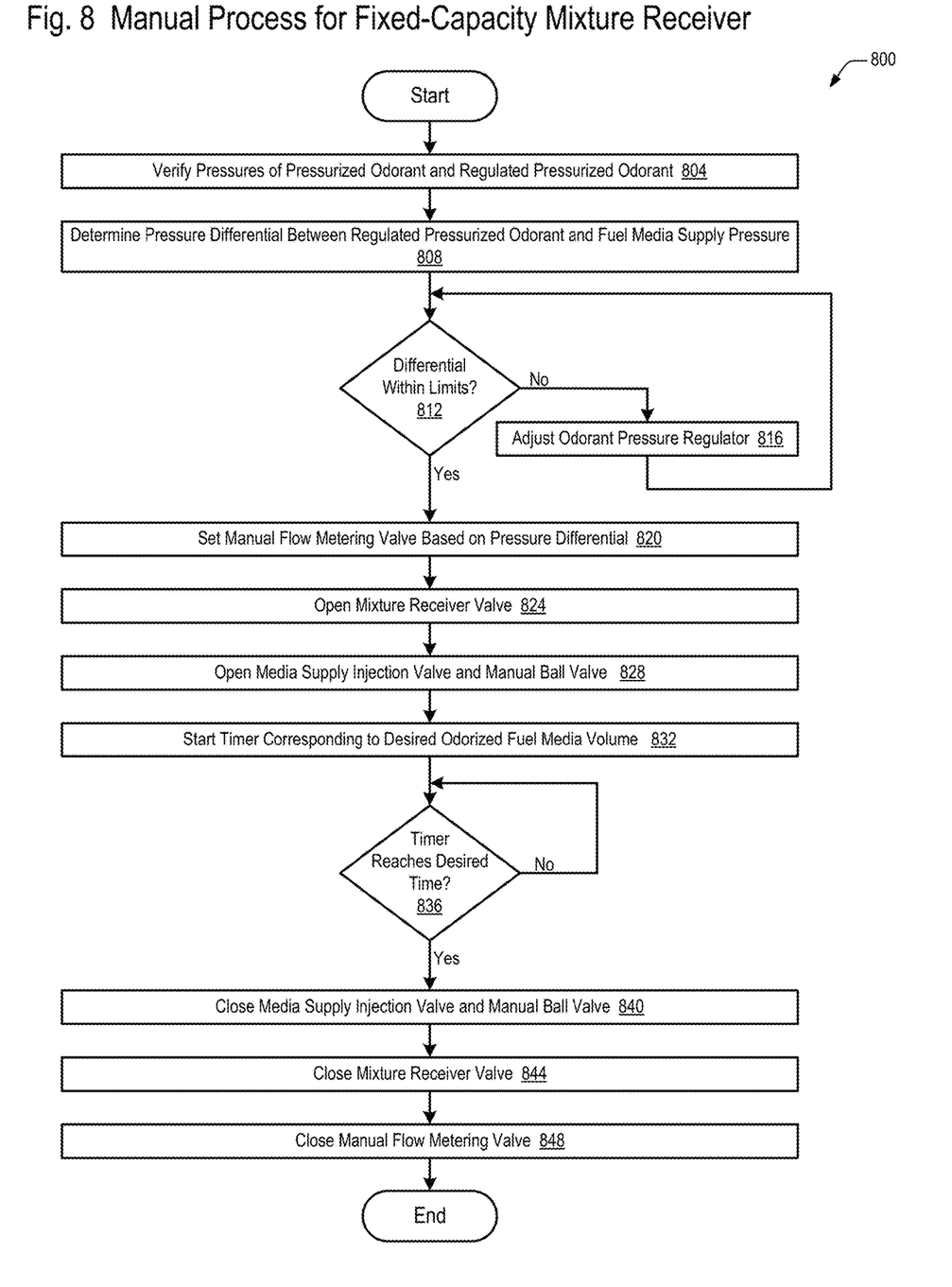
FIG. 8 is a flowchart depicting a manual process for a fixed-capacity mixture receiver in accordance with embodiments of the present invention.

Referring now to FIG. 8, a flowchart illustrating a manual process 800 for a fixed-capacity mixture receiver is shown. Manual processes of FIG. 7 and FIG. 8 may be used anytime, but may be most useful during a power outage to the system or a failure of actuators 228 or other components of the control system 104. Flow begins at block 804.

At block 804, the processor 304 or an operator of the system 100 verifies pressures of pressurized odorant 156 and regulated pressurized odorant 164. Pressurized odorant 156 may be read on the pressure gauge 212 while the regulated pressurized odorant 164 may be based on the actuators 228 being enabled or disabled. Flow proceeds to block 808.

At block 808, a pressure differential is determined between the regulated pressurized odorant 164 and the fuel media supply pressure 140. The pressure differential determines the odorant concentration in the odorized fuel media 168. Flow proceeds to decision block 812.

At decision block 812, a determination is made if the pressure differential determined in block 808 is within specified limits that correspond with an acceptable odorant concentration range. If the pressure differential is not within the limits, then flow proceeds to block 816. If the pressure differential is within the limits, then flow proceeds to block 820.

At block 816, the odorant pressure regulator 208 is adjusted. If decision block 812 determined the differential was not within limits and the differential was above a high limit, the odorant pressure regulator 208 is adjusted downward. If decision block 812 determined the differential was not within limits and the differential was below a low limit, the odorant pressure regulator 208 is adjusted upward. Flow proceeds to decision block 812 to check if the pressure differential is now within limits, based on the adjustment performed in block 816.

At block 820, the manual flow metering valve 256 is set based on the pressure differential determined in block 808. The setting may be based on details of actual designed systems, and is therefore system-dependent. Flow proceeds to block 824.

At block 824, the mixture receiver valve 128B is opened, allowing odorized fuel media 168 to flow into the mixture receiver 124. Flow proceeds to block 828.

At block 828, the media supply injection valve 128A is opened, initiating unodorized fuel media 160 flow through the fuel media supply flow meter 136 to the mixture receiver 124. The manual ball valve 244 is concurrently opened, initiating flow of pressurized regulated odorant 164 to the mixture receiver 124. Flow proceeds to block 832.

At block 832, a timer is started corresponding to a desired odorized fuel media volume to produce. The timer may be separate from the control system 104 since power may not be provided to the control system 104. The timer value may be design-dependent and based on details of actual designed systems. Flow proceeds to decision block 836.

At decision block 836, an operator determines if the timer has reached the desired time from block 832. In one embodiment, the timer may count up to the desired value. In another embodiment, the timer may count down from a desired value to zero. If the timer reaches the desired time, then flow proceeds to block 840. If the timer has not reached the desired time, then flow proceeds to decision block 836 to continue checking the timer.

At block 840, the timer has reached the desired value and a desired amount of odorized fuel media 168 has been produced to the mixture receiver 124. An operator of the system 100 closes the media supply injection valve 128A and the manual ball valve 244. Flow proceeds to block 844.

At block 844, an operator of the system 100 closes the mixture receiver valve 128B since the desired amount of odorized fuel media 168 has been provided to the mixture receiver 124. Flow proceeds to block 848.

At block 848, an operator of the system 100 closes the manual flow metering valve 256. Production of the fixed-capacity mixture receiver is now completed. Flow ends at block 848.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:
1. A system, comprising:
a fuel media supply, configured to provide unodorized fuel media, coupled to:
a media supply injection valve; and
a fuel media supply flow meter;
an odorant supply, configured to provide pressurized odorant, coupled to:
an odorant pressure regulator, configured to provide regulated pressurized odorant, coupled to each of:
a first actuator, configured to allow regulated pressurized odorant flow at a first pressure when enabled;
a manual ball valve, configured to allow regulated pressurized odorant flow to be manually adjusted between no flow and the first pressure when enabled, coupled to:
a manual flow metering valve; and
a second actuator, configured to allow regulated pressurized odorant flow at a second pressure lower than the first pressure when enabled;
a mixture receiver, coupled to the fuel media supply and each of the first and second actuators and the manual flow metering valve, configured to receive odorized fuel media comprising a mixture of the unodorized fuel media and regulated pressurized odorant; and
a control system, comprising:
a processor; and
a memory, coupled to the processor, comprising instructions, that when executed by the processor, are configured to:
initiate production of the mixture;
adjust the mixture with the first and second actuators, in response to the mixture not including a desired concentration of the regulated pressurized odorant; and
terminate production of the mixture.

2. The system of claim 1, wherein prior to the control system initiates production of the mixture, a pressure differential between the fuel media supply and the regulated pressurized odorant is within predetermined limits.

3. The system of claim 2, wherein in response to the pressure differential is not within the predetermined limits, the odorant pressure regulator is adjusted until the pressure differential is within the predetermined limits.

4. The system of claim 2, wherein one or more of the first and the second actuators are not operable to provide a continuous flow of regulated pressurized odorant to the mixture receiver, and in response:
set the manual flow metering valve based on the pressure differential;
open the media supply injection valve and the manual ball valve; and
close the manual ball valve, in response to the fuel media supply flow meter indicates no fuel media supply pressure.

5. The system of claim 2, wherein one or more of the first and the second actuators are not operable to provide a fixed amount of regulated pressurized odorant to the mixture receiver, and in response:
set the manual flow metering valve based on the pressure differential;
open a mixture receiver valve;
open the media supply injection valve and the manual ball valve;
start a timer that corresponds to the fixed amount of odorized fuel media;
in response to the timer ends:
close the media supply injection valve and the manual ball valve;
close the mixture receiver valve; and
close the manual flow metering valve.

6. The system of claim 1, wherein the processor initiates production of the mixture comprises the processor is configured to:
detect a positive fuel media supply pressure from the fuel media supply flow meter, and in response:
enable the second actuator.

7. The system of claim 6, wherein the processor terminates production of the mixture comprises the processor is configured to:
detect a zero flow rate of the fuel media supply pressure from the fuel media supply flow meter, and in response:
disable the first and second actuators.

8. The system of claim 1, wherein the processor initiates production of the mixture comprises the processor is configured to:
receive data that indicates a volume of the mixture to produce;
calculate an odorant volume based on the volume of the mixture to produce and the desired concentration of odorant;
detect a positive flow rate of the fuel media supply pressure from the fuel media supply flow meter, and in response:
enable the second actuator.

9. The system of claim 8, wherein the processor terminates production of the mixture comprises the processor is configured to:
determine a portion of the mixture has been produced, wherein the portion comprises less than the volume of the mixture to produce;
disable the first actuator, in response to the first actuator is currently enabled;
determine the odorant volume has been provided to the mixture; and
disable the second actuator.

10. The system of claim 1, wherein the processor detects a failure of one or more of the first and the second actuators, and in response provides a notification to an operator to adjust the manual ball valve.

11. A method, comprising:
determining one or more actuators of a system to provide odorized fuel media to a mixture receiver are not operable to provide a continuous flow of odorized fuel media;
determining a pressure differential between a fuel media supply configured to provide unodorized fuel media and a regulated pressurized odorant is within predetermined limits, the unodorized fuel media being combined with the regulated pressurized odorant to produce the odorized fuel media;
setting a manual flow metering valve, coupled to an odorant supply, based on the pressure differential;
opening a media supply injection valve coupled to the fuel media supply, to allow flow of the unodorized fuel media to the mixture receiver;
opening a manual ball valve coupled to the manual flow metering valve, to allow flow of the regulated pressurized odorant to the mixture receiver; and
closing the manual ball valve, in response to no fuel media supply pressure from the fuel media supply.

12. The method of claim 11, wherein in response to the pressure differential not being within the predetermined limits, the method comprising:
adjusting the odorant pressure regulator until the pressure differential is within the predetermined limits, wherein the odorant pressure regulator is coupled between the odorant supply and the manual ball valve.

13. The method of claim 11, wherein the media supply injection valve and the manual ball valve are opened simultaneously.

14. The method of claim 11, wherein the manual flow metering valve is configured to restrict flow of pressurized odorant from the odorant supply when the manual ball valve is open.

15. The method of claim 11, wherein one or more of the fuel media supply and the mixture receiver comprises a pipeline configured to transport the odorized fuel media.

16. A method, comprising:
determining one or more actuators of a system to provide odorized fuel media to a mixture receiver are not operable to provide a fixed amount of odorized fuel media;
determining a pressure differential between a fuel media supply configured to provide unodorized fuel media and a regulated pressurized odorant is within predetermined limits, the unodorized fuel media being combined with the regulated pressurized odorant to produce the odorized fuel media;
setting a manual flow metering valve, coupled to an odorant supply, based on the pressure differential;
opening a mixture receiver valve;
opening a media supply injection valve coupled to the fuel media supply, to allow flow of the unodorized fuel media to the mixture receiver;
opening a manual ball valve coupled to the manual flow metering valve, to allow flow of the regulated pressurized odorant to the mixture receiver;
starting a timer that corresponds to the fixed amount of odorized fuel media;
in response to the timer ends:
closing the media supply injection valve and the manual ball valve;
closing the mixture receiver valve; and
close the manual flow metering valve.

17. The method of claim 16, wherein in response to the pressure differential not being within the predetermined limits, the method comprising:
adjusting the odorant pressure regulator until the pressure differential is within the predetermined limits, wherein the odorant pressure regulator is coupled between the odorant supply and the manual ball valve.

18. The method of claim 16, wherein the media supply injection valve and the manual ball valve are opened simultaneously.

19. The method of claim 16, wherein the manual flow metering valve is configured to restrict flow of pressurized odorant from the odorant supply.

20. The method of claim 16, wherein the mixture receiver comprises a vessel of fixed volume, wherein the fixed amount comprises all or a portion of the fixed volume.

* * * * *